United States Patent
Kim et al.

(10) Patent No.: US 11,915,092 B2
(45) Date of Patent: Feb. 27, 2024

(54) REMOTE CONTROL DEVICES, METHODS FOR OPERATING REMOTE CONTROL DEVICES AND REMOTE CONTROL DEVICE MANAGEMENT SYSTEMS FOR MANAGING THE REMOTE CONTROL DEVICES

(71) Applicant: OHSUNG ELECTRONICS CO., LTD., Busan (KR)

(72) Inventors: Ji Hoon Kim, Gyeongsangbuk-do (KR); So Young Lee, Gyeongsangbuk-do (KR); Hong Min Lee, Gyeongsangbuk-do (KR)

(73) Assignee: OHSUNG ELECTRONICS CO., LTD., Busan (KR)

( * ) Notice: Subject to any disclaimer, the term of this patent is extended or adjusted under 35 U.S.C. 154(b) by 8 days.

(21) Appl. No.: 17/810,704

(22) Filed: Jul. 5, 2022

(65) Prior Publication Data
US 2023/0342574 A1    Oct. 26, 2023

(30) Foreign Application Priority Data
Apr. 26, 2022   (KR) .......................... 10-2022-0051483

(51) Int. Cl.
*G06K 7/12*   (2006.01)

(52) U.S. Cl.
CPC ...................................... *G06K 7/12* (2013.01)

(58) Field of Classification Search
None
See application file for complete search history.

(56) References Cited

U.S. PATENT DOCUMENTS 6,590,503 B1 * 7/2003 Elliott .................... G08C 19/28
340/12.27

FOREIGN PATENT DOCUMENTS

| KR | 2013291 B1 | 11/2019 |
|----|-----------|---------|
| KR | 2371490 B1 | 3/2022 |

\* cited by examiner

*Primary Examiner* — Kristy A Haupt
(74) *Attorney, Agent, or Firm* — Pearne & Gordon LLP

(57) ABSTRACT

A remote control device for remotely controlling a target device to be controlled is provided. The remote control device includes a main software module configured to provide a code to identify an IR library code to a management software module; the management software module configured to provide the IR library code to the main software module, wherein the main software module is configured to generate IR remote control signals based on the IR library code and transmit the IR remote control signals to the target device.

6 Claims, 6 Drawing Sheets

REMOTE CONTROL DEVICES, METHODS FOR OPERATING REMOTE CONTROL DEVICES AND REMOTE CONTROL DEVICE MANAGEMENT SYSTEMS FOR MANAGING THE REMOTE CONTROL DEVICES

CROSS REFERENCE TO RELATED APPLICATION

The present application claims priority to Korean Patent Application No. 10-2022-0051483, filed Apr. 26, 2022, the entire contents of which is incorporated herein for all purposes by this reference.

TECHNICAL FIELD

The present disclosure relates to remote control devices for remotely controlling a target device to be controlled, methods for operating the remote control devices, and a remote control device management system for managing the remote control devices. Also, the present disclosure relates to remote control device management system for activating a license for an infrared (IR) library database (DB) installed in a remote control device.

BACKGROUND

In general, various electronic devices are provided in home or office and are used to lead a convenient life. For example, there are electronic devices that can be connected to various devices, such as videocassette recorders (VCRs), Digital Video Disc (DVD) players, Blu-ray Disc® players, DivX® players, set-top boxes, personal computers, home theaters, and so on.

The numbers of such electronic devices described above are gradually increasing. These electronic devices described above have a plurality of operation buttons thereon and are accompanied by their respective remote control devices for remote control operations.

One or more remote control devices are necessary for each electronic device. Thus, in order to operate multiple electronic devices, a user needs to have remote control devices by the number of such electronic devices. Because of the increasing number of remote control devices, some of the remote control devices happen to be lost which disables users to operate their electronic devices.

Generally, an electronic device receives infrared remote control signals wirelessly transmitted from the remote control device, detects a custom code and a data code of the remote control signal, and then performs an operation corresponding to the detected codes. The remote control signals for controlling the operation of the target external device are usually stored in the remote control device.

However, as described above, the remote control signals for operating and controlling the target external devices are stored in the remote control device, so that new remote control signals cannot be updated easily. In addition, even if the electronic devices are the same type of a product, since the remote control signals are different from a manufacturer to a manufacturer, the inconvenience of using it in the home is actually very significant.

BRIEF SUMMARY

One object of the present disclosure is to provide methods of managing a remote control signal database installed in a remote control device.

Another object of the present disclosure is to provide methods of learning new remote control signal database and updating the remote control signal database installed in the remote control device.

Yet another object of the present disclosure is to provide methods of activating the remote control signal database installed in the remote control device.

In one aspect, a remote control device for remotely controlling a target device to be controlled, includes a main software module configured to provide a code to identify an IR library code to a management software module; the management software module configured to provide the IR library code to the main software module, wherein the main software module is configured to generate IR remote control signals based on the IR library code and transmit the IR remote control signals to the target device.

In the remote control device management method for a remote control device according to the present disclosure, the remote control device management system stores the Infrared library database (IRDB) in a certain region in the control module of the remote control device, so there is an advantage that there is no need for a separate space to store the IRDB.

In addition, the present disclosure has the advantage of maintaining a certain level of security, because the remote control signal information stored in the IRDB can be activated only by the license activation. Also, it can accurately count the number of accesses to the IRDB by the number of the license activations, thus accurate billings become possible based on the total number of the accesses to the IRDB.

DETAILED DESCRIPTION OF EMBODIMENTS

The foregoing and other aspects of the present disclosure will become more clearly apparent through preferred embodiments described with reference to the accompanying drawings. Hereinafter, embodiments of the present disclosure will be described in detail such that those skilled in the art can easily understand and reproduce them.

Figure 1:
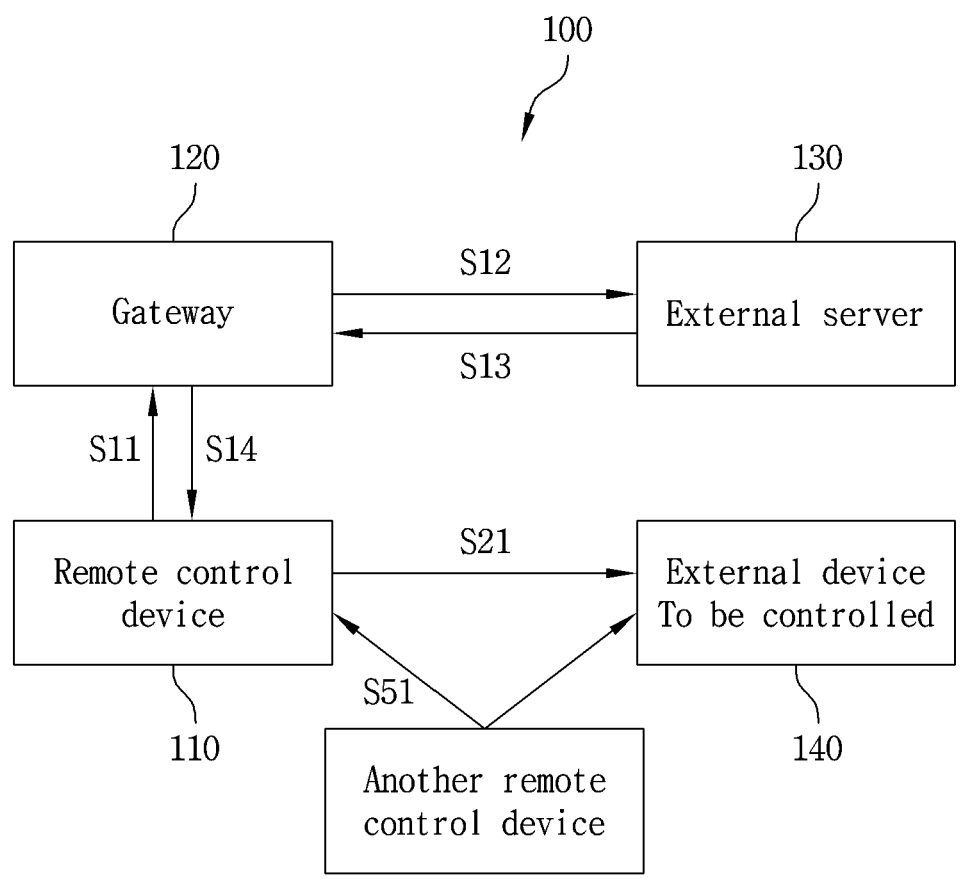
FIG. 1 illustrates an example of a schematic diagram of a remote control device management system, according to an embodiment of the present disclosure.

FIG. 1 illustrates an example of a schematic diagram of a remote control device management system according to an embodiment of the present disclosure.

The remote control device management system 100 includes remote control device 110, gateway 120, and external server 130. It is also possible that gateway 120 may be embedded into remote control device 110.

Remote control device 110 includes storage module 110b and control module 110a. It is noted that remote control device 110 may include other modules in addition to these modules. As an example, remote control device 110 may include communication modules (e.g., LED emitting diodes and photodetectors) for wireless communication with target external devices.

The storage module 110b includes a memory device to store the necessary software programs and database for operating remote control device 110 therein. The software program stored in the storage module may be stored at the manufactured time in advance or may be provided by an external device after the manufactured time and then be stored.

Control module 110a include one or more processors and memories to store necessary control software programs and databases. Control module 110a may be composed of a single module or multiple modules. The first and second regions may be preferably logically separated if they are not physically separated. In the case of a single module, control module 110a may be partitioned into first region 201 and second region 202.

The first region 201 is installed with the main software module for operating remote control device 110, and the second region 202 is installed with the management software module and a remote control signal database (i.e., an IR library database). The management software module manages the IR library database (IRDB) which stores a list of IR library codes for generating IR remote control signals for controlling various target devices according to respective remote control commands.

The IR library database installed in the second region 202 is described in detail below. In order to control the target external device using the IR library database installed in the second region 202, the second region 202 may require a license activation for the stored IR library database code remote control signal information corresponding to the target external device to be controlled. In other words, the IR library database installed in remote control device 110 is initially inactivated, and the IR library codes can be transmitted to the main software module 201 only after the IR library database is activated with a license key code.

Accordingly, remote control device 110, particularly, the main software module controls the commination module to send a request for a license activation for the IRDB to the gateway 120. That is, remote control device 110 transmits a license activation request to the gateway 120 in step S11. The license activation request may be accompanied with the first remote control device information for identifying the remote control device and first IR library information for identifying the IRDB. As an example, the first remote control device information includes a model number of the remote control device, and the IR library information may include a version of the IR library DB to be activated.

Gateway 120 forwards the license activation request to external server 130 with first remote control device information and first infrared (IR) library information in step S12. Gateway 120 also may transmit the unique information of the gateway to the external server 130. The unique information of the gateway may be an identifier including an identifier or password of the gateway, and the identifier may be a unique identifier, such as an identifier set by an administrator or a serial number of the gateway.

Upon receiving the license activation request, external server 130 determines whether remote control device 110 is eligible for a license on the IR library database. If remote control device 110 is eligible, external server 130 sends back the license activation information to the gateway 120 in step S13. The license activation information includes second remote control device information, second IR library information and a license activation key code for activating the IR library database. The license activation information may be encrypted by an encryption algorithm stored in external server 130, which is symmetrical with the decryption algorithm stored in remote control device 110.

Gateway 120 receives the encrypted license activation information from the external server 130 and forwards the encrypted license activation information to remote control device 110 in step S14.

Remote control device 110 receives the license activation information from the external server 130 via the gateway 120. Subsequently, the main software module provides the received license activation information to the management software module.

When the license activation information is encrypted, the management software module may decrypt the license activation information by a decryption algorithm to extract the second remote control device information, the second IR library information and the license activation key code. The management software module compares the decrypted remote control device information and IR library information with the transmitted remote control device information and IR library information. In other words, the management software module activates a license for the IRDB only when the second remote control device information and second IR library information match the first remote control device information and first IR library information, respectively. To do this decryption, the management software module includes the decryption algorithm corresponding to the encryption algorithm.

Once the IRDB is activated, when the main software module requests an IR library code for a certain remote control command, the management software module 201 retrieves the requested IR library code from the IRDB, and provides the IR library code to the main software module.

Figure 2:
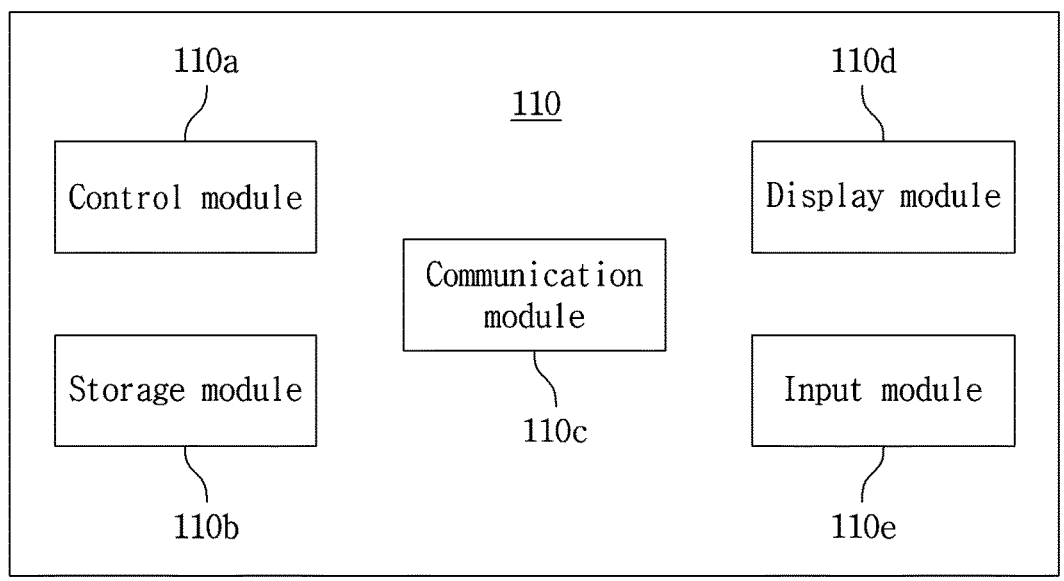
FIG. 2 illustrates an example of a schematic diagram of a remote control device, according to an embodiment of the present disclosure.

FIG. 2 illustrates an example of a schematic diagram of remote control device 110 according to an embodiment of the present disclosure. Hereinafter, referring to FIG. 2, the components of remote control device 110 according to an embodiment of the present disclosure will be described.

Remote control device 110 includes control module 110a, storage module 110b, communication module 110c, indication module 110d, and input module 110e. It is noted that other configurations other than those described above may be included in remote control device 110.

Display module 110d includes a display screen to display the current status of remote control device 110 or to display the information requested by control module 110a. Display module 110d also displays various information under the control of control module 110a. For example, display module 110d displays the current time, weather, and environmental information inside the house. In addition, display module 110d displays information regarding the target electronic devices under remote control.

Input module 110e may be equipped with buttons, touch panels, and the like. Input module 110e may perform the function of a display when input module 110e is equipped with a touch panel. The user may request information necessary for the remote control device using input module 110e. That is, input module 110e inputs a signal requesting control of the target device.

In addition, input module 110e may include a microphone, and may receive voice inputs through the microphone as remote control commands. In addition, a specific signal may be inputted through communication with an external device (user terminal) without the configuration of a button or touch panel.

The communication module 110c performs communication with the external server 120 via the gateway 120. As described above, the communication module 110c transmits a license activation request to the external server 130 via the gateway 120, and receives license activation information from the external server 130 via the gateway 120. The communication module 110c may include an infrared light emitting diode (LED) to perform communication with the target external device by transmitting IR signals for controlling the target external device.

In addition, remote control device 110 may store the IR library database in the second region 202 which was installed at the manufactured time of the remote control device. The IR library database includes a list of IR library codes for each of remote control device models, target electronic device models, and remote control commands. Thus, the remote control device controls any one of the target electronic devices by referring to the IR library database.

However, if the IR library database installed in remote control device 110 is not able to be updated, remote control device 110 would have a problem in remotely controlling target external devices that are not supported by the IR library database that was installed at the manufactured time of remote control device 110 or that are new devices released after the manufactured time.

Accordingly, remote control device 110 according to one embodiment of the present disclosure may update the remote control signal information stored in the second region by learning from another remote control device.

In specific, the communication module 110c with an IR sensor detects S51 the remote control signals transmitted from another remote control device in which the remote control signals to be learned are stored. Then, control module 110a extracts the IR library code from the received remote control signals and stores S53 the extracted IR library code in the second region 202.

The storage module 110b stores the necessary software programs for operating remote control device 110. The software programs stored in the storage module 110b may be stored at the manufactured time or may be provided later from an external device.

Control module 110a is partitioned into a first and a second region. The first region is operated by the main software module that drives the remote control device, and the second region is operated by the management software module that manages the remote control signal. The first region is installed with the main software module for controlling the remote control device, and the second region is installed with management software module for managing the IR library database. In addition, the second region stores the remote control signal for controlling the various controlled devices.

As such, control module 110a performs some of the functions of the storage module 110b, or control module 110a performs only the control functions, and the storage function may be performed in the storage module 110b.

However, when the remote control signal information is stored in the storage module, the control of the remote control signal information may be handled by the management software module, and it is preferably not handled by the main software module. Each of control module 110a and the storage module 110b may be implemented with a processor, a memory such as ROM and RAM, firmware and appropriate software.

In addition, the main software module analyzes the voice input to extract a remote control command and requests the IR library code corresponding to the remote control command to the management software module in step S31. Subsequently, the management software module 201 retrieves the requested IR library code from the IRDB, and provides the IR library to the main software module in step S33.

Figure 3:
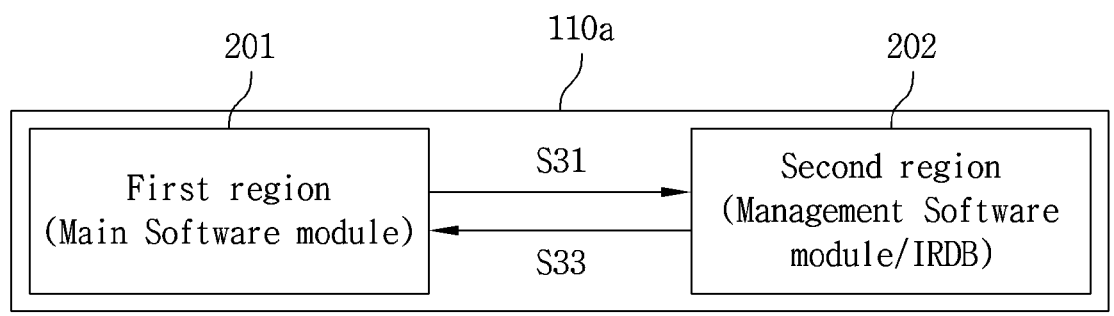
FIG. 3 illustrates an example of a schematic diagram of a control module in the remote control device, according to an embodiment of the present disclosure.

FIG. 3 illustrates an example of a schematic diagram of control module 110a in remote control device 110 according to one embodiment of the present disclosure. Hereinafter, referring to FIG. 3, a control module constituting a remote control device according to an embodiment of the present disclosure.

In particular, according to FIG. 3, control module 110a in remote control device 110 may be divided into the first region 201 and the second region 202, the first region 201 is installed with the main software module, the second region 202 is installed with management software module, in which the remote control signals for controlling a plurality of target external devices to be remotely controlled, as described above.

The main software module analyzes voice commands, button inputs, touch inputs or the other type inputs inputted from input module 110e, and extracts respective remote control commands. The main software module sends a request for an IR library code corresponding to the extracted remote control command to the management software module in step S31. For example, if a voice input is "Turn on the OO (a manufacturer's name) company TV," the main software module sends a request for an IR library code for turning on the OO company TV to the management software module.

The management software module provides the IR library code to the main software module in step S33. The IR library code can include a carrier pulse unit period, the total number of pulses to be generated, and a set of pulse duration data comprising alternating high and low pulse duration values. Then, the main software module calculates each of pulse durations for respective high and low pulses that constitute the IR remote control signals, by multiplying the carrier pulse unit period with each of pulse duration data. The high pulses refer to pulses with a certain non-zero amplitude higher than a threshold (such as a ratio of 0.5 of the highest possible amplitude/the lowest possible amplitude of an IR pulse) and the lower pulses refer to pulses with zero amplitude or amplitudes lower than the threshold.

Figure 4:
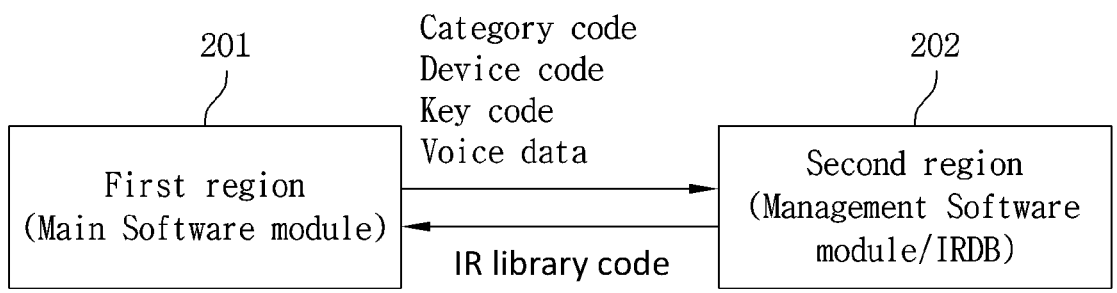
FIG. 4 illustrates a schematic diagram showing a list of information which the main software module provides to the management software module, according to an embodiment of the present disclosure.

FIG. 4 illustrates another schematic diagram showing a list of information that the main software module provides to the management software module along with a request for an IR library code, according to one embodiment of the present disclosure. When receiving the request with the list of information in step S31, the management software module provides an IR library code the corresponding to the list of to the information to main software module in step S33.

In one embodiment, the list of information may be composed of a category code, a device code, and a key code. The category code indicates a classification of a target device to be remotely controlled, such as, TVs, set top boxes (STBs), air purifiers, air conditioners, fans, and so on. The device code refers to a code number of the target device, which includes a manufacturer identity. The key code refers to a key serial number of the remote control device that controls the target device. In addition, the main software module also transmits voice data to the management software module, if necessary. The voice data refers to a voice command inputted from a user, such as "setting an air conditioner to a certain temperature degree." If the main software module is not capable of processing voice data, the main software module can send a notification indicating no voice processing capability to the management software module.

The list of information may be a combination code of a category code, a device code, and a key code.

As an example, the combination code for a channel up ("UP") for an LG® TV may be composed of: "1" (the category code for TVs), "001" (the device code for manufacturer LG®), and "8" (the key code for a channel up), which produces "100018"

As another example, the combination code for changing the channel of an LG® TV to Ch. 23 is composed of "1" (the category code for TVs), " 001" (the device code for manufacturer "A"), key code "12" (the code for tenths digit "2") and key code "13" (the code for ones digit "3"), which produces "100011213."

As yet another example, the code for a volume up (UP) for manufacture A's STB, the category code is composed of "2" (the category code for STBs), the device code is "001" (the device code for manufacturer LG®), and the key code is "6" (a code for a volume up), which produces "20016."

Figure 5:
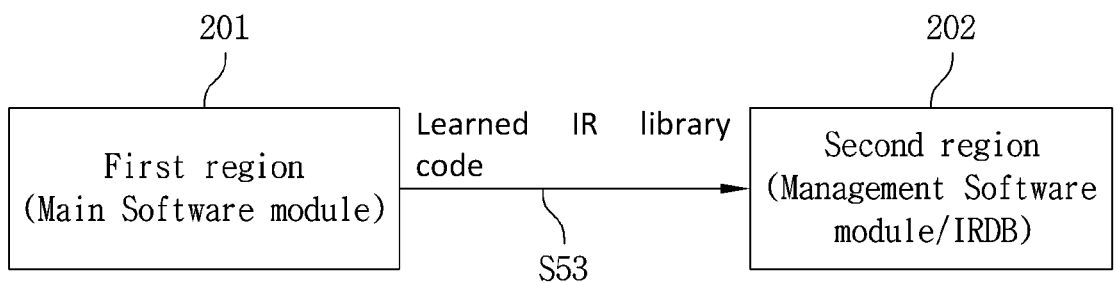
FIG. 5 illustrates an example of learning remote control information by the remote control device, according to an embodiment of the present disclosure.

FIG. 5 illustrates an example of learning a new IR library code by the remote control device 110, according to an embodiment of the present disclosure. In particular, the figure shows that the main software module and management software module in the remote control device 110 learn the remote control information. As described above, the remote control device 110 proceeds with a learning process for remote control information that is not stored therein, and stores the remote control information in the second region through the learning process.

The main software module may receive and capture IR remote control signals transmitted by another remote control device 150 (shown in FIG. 1) for a certain time. In order to do so, the remote control device 110 enters the remote control signal reception mode to detect and capture the IR remote control signals with photodetectors in the communication module 110c. Subsequently, the main software module measures respective high-pulse and low pulse durations (i.e., widths) in the detected IR remote control signals and extracts a carrier unit period and a set of pulse duration data for alternating high and low pulses. In one embodiment, the carrier unit period can be calculated as a greatest common divisor of all of the high-pulse and low pulse durations, and the set of pulse duration (i.e., width) data can be calculated by dividing each of the high-pulse and low pulse durations by the greatest common divisor.

The main software module provides the extracted carrier pulse unit period and the set of alternating high and low pulse duration as a learned IR library code to the management software module. The management software module may add the learned IR library code to the IR library database in the second region 202. Alternatively, management software module may store the learned IR library code in a separate position in a different format from the existing IR library database.

That is, the remote control information stored in the second area at the time of manufacture of the remote control device is stored in the first format, while the remote control information generated through learning is stored in the second format. Of course, the main software module can know whether the remote control information is stored in the 1st format or in the 2nd format. That is, the main software module determines that the remote control information generated through learning is stored in the second format.

As such, the remote control device proposed in the present disclosure stores the remote control information in the 2nd area managed by the management software module through the learning of the remote control information.

Figure 6:
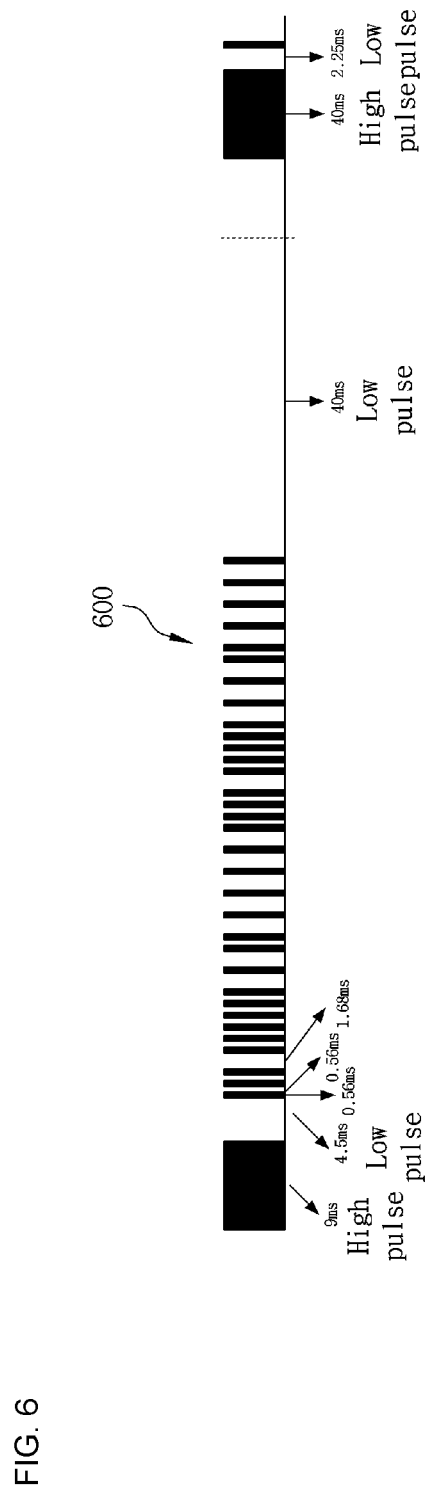
FIG. 6 illustrates an example of the remote control signals generated based on the information provided by management software module, according to an embodiment of the present disclosure.

FIG. 6 illustrates an example of IR remote control signal information provided by management software module according to one embodiment of the present disclosure. Hereinafter, one example of an IR library code provided in step 33 by the management software module will be described.

The management software module provides, to the main software module, an IR library code including a carrier pulse unit period, a total number of pulses, and a set of pulse duration data for alternating high and low pulses.

As an example of an IR library code, when the carrier pulse unit period is 25,600 ns, and the total number of the pulses which are the repetitions of respective high and low pulses is 76, the IR remote control signals are generated as follow.

1) Carrier pulse unit period=26500 ns
2) The total number of pulses=76
3) The set of pulse duration data for alternating high and low pulses, which totals to 76 pulses:
   {340, 168, 21, 21, 21, 21, 21, 64, 21, 21, 21, 21, 21, 21, 21, 21,
   21, 21, 21, 64, 21, 21, 21, 64, 21, 64, 21, 64, 21, 64,
   21, 64, 21, 21, 21, 21, 21, 64, 21, 21, 21, 21, 21, 21, 21, 64,
   21, 64, 21, 64, 21, 64, 21, 21, 21, 64, 21, 64, 21, 64, 21, 21,
   21, 21, 21, 1545, 340, 85, 21, 3660, 340, 85, 21, 3660}.
4) The pulse durations (i.e., widths) for the alternating high and low pulses are calculated by multiplying each pulse duration (i.e., width) data by the carrier pulse unit period:
   Data [0]: 340×26500 ns=approximately 9 ms (High pulse)
   Data [1]: 168×26500 ns=approximately 4.5 ms (Low pulse)
   Data [2]: 21×26500 ns=approximately 0.56 ms (High pulse)
   Data [3]: 21×26500 ns=approximately 0.56 ms (Low pulse)
   . . .
   Data [74]: 21×26500 ns=approximately 0.56 ms (High pulse)
   Data [75]: 3660×26500 ns=approximately 97 ms (Low pulse)

The main software module generates remote control signals, which are the repetitions of the high and low pulses, using the remote control signal information provided by the management software module.

The main software module generates remote control signals that are repetitions of the high and low pulses. In particular, the main software module calculates high pulse durations and low pulse durations, using the carrier pulse unit period and a set of pulse duration data. In the above embodiment, the first pulse (high pulse) duration (i.e., time length): 25,600 ns*340 (the first value (Data [0]) in the data set)=about 9 ms, the second pulse (low pulse) duration:

25.600 ns*168 (the second value in the data set)=about 4.5 ms, the third pulse (high pulse) duration: 25,600 ns*21=about 0.56 ms, the fourth pulse (low pulse) duration: 25.600 ns*21=about 0.56 ms, and does the same multiplication for all remaining pulse duration data until to obtain the 76$^{th}$ pulse duration. The set of pulse duration data may have different values for different remote control operations, such as a volume up/down or a channel up/down, and so on.

By this way, the main software module generates the remote control signals which are the repetitions of the respective high pulses and low pulses in order to remotely control the target external device under control.

Figure 7:
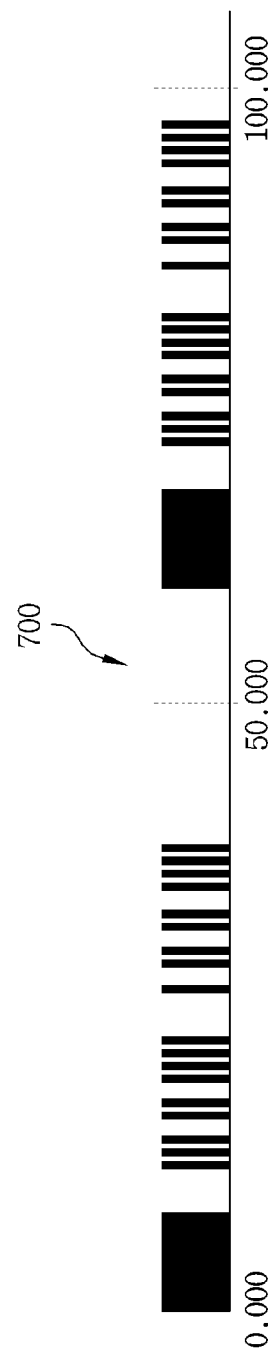
FIG. 7 illustrates an example of another remote control signals generated based on different remote control information provided by the management software module, according to one embodiment of the present disclosure.

FIG. 7 illustrates an example of another IR remote control signals 700 generated based on a different IR library code for a different remote control command, according to one embodiment of the present disclosure.

As described above, the present disclosure enables license activation of the license-inactivated remote control signal DB stored in the management software module, and provides information corresponding to the remote control signal stored in the activated remote control signal DB to the main software module. The main software module generates remote control signals from the information provided, and transmits the generated remote control signals to remotely control the device under control.

Although the present disclosure has been described with reference to the embodiments shown in the figures, these are only illustrative and one of ordinary skill in the art will understand that various modifications and even other embodiments are possible.

DESCRIPTIONS OF THE REFERENCE NUMBERS

100: Remote control device management system
110: Remote control device
120: Gateway
130: External server
110a: Control module
110b: Storage module
110c: Communication module
110d: Display module
110e: Input module

The invention claimed is:

1. A method of transmitting infrared (IR) remote control signals to a target external device to be controlled by a remote control device in which a main software module and a management software module are installed, the method comprising:
   providing, by the main software module, a code to identify an IR library code to the main software module;
   providing, by the management software module, the IR library code to the main software module; and
   transmitting, to the target external device, IR remote control signals generated based on the IR library code by the main software module,
   wherein the code includes a category code. a device code and a key code.

2. The method of claim 1, further comprising:
   calculating respective pulse durations of alternating high and low pulses by multiplying the carrier pulse unit period with each pulse duration data.

3. The method of claim 1, further comprising
   detecting another IR remote control signals transmitted from another remote control device during a certain period of time, and
   extracting a carrier unit period and a set of pulse duration data for alternating high and low pulses from the other IR remote control signals.

4. The method of claim 3, wherein
   the main software module is configured to provide the extracted carrier pulse unit period, and the set of pulse duration data for high and low pulses to the management software module, and
   the management software module stores the extracted carrier pulse unit period, and the set of pulse duration data as a new IR library code.

5. A method of transmitting infrared (IR) remote control signals to a target external device to be controlled by a remote control device in which a main software module is installed in a first region and a manauement software module is installed in a second region, the method comprising:
   installing a first 1R library database in a first format into the second region;
   detecting another IR remote control signals transmitted from another remote control device during a certain period of time;
   extracting a carrier unit period and a set of pulse duration data for alternating high and low pulses from the other IR remote control signals;
   providing the extracted carrier pulse unit period, and set of pulse duration data for high and low pulses to the management software module; and
   storing the extracted carrier pulse unit period, and set of pulse duration data as a learned IR library code in a second format in the second region.

6. A remote control device for remotely controlling a target device to be controlled, comprising:
   a main software module configured to provide a code to identify an IR library code to a management software module;
   the management software module configured to provide the IR library code to the main software module,
   wherein the main software module is configured to generate IR remote control signals based on the IR library code and transmit the IR remote control signals to the target device,
   wherein the IR library code comprises a carrier unit period, a total number of pulses, and a set of pulse duration data for alternating high and low pulses.

* * * * *